United States Patent [19]

Larsen

[11] Patent Number: 4,552,609

[45] Date of Patent: Nov. 12, 1985

[54] METHOD AND APPARATUS FOR FRICTION WELDING

[75] Inventor: Howard M. Larsen, Daytona Beach, Fla.

[73] Assignee: Homac Mfg. Company, Ormond Beach, Fla.

[21] Appl. No.: 653,791

[22] Filed: Sep. 24, 1984

[51] Int. Cl.[4] .............................................. B23K 27/08
[52] U.S. Cl. ................................. 156/358; 156/73.5; 156/366; 156/580; 228/2
[58] Field of Search .......................... 228/2, 112, 113; 156/73.5, 580, 358, 366; 264/68

[56] References Cited

U.S. PATENT DOCUMENTS

| | | | |
|---|---|---|---|
| 3,451,121 | 6/1969 | Yocum | 228/2 |
| 3,562,073 | 2/1971 | Kibler | 156/73.5 |
| 3,564,703 | 2/1971 | Kiwalle | 228/2 |
| 3,595,462 | 7/1971 | Hirayama | 228/2 |
| 3,750,927 | 8/1973 | Miller et al. | 228/112 |
| 3,896,985 | 7/1975 | Kiwalle | 228/2 |

Primary Examiner—Michael Wityshyn
Attorney, Agent, or Firm—John E. Benoit

[57] ABSTRACT

Friction welding apparatus for joining a rotatable element to a fixed element by means of a continuous drive system including apparatus for precisely orienting the rotational position of the rotatable element relative to the fixed element. Control apparatus is provided terminating the applied rotational force after a predetermined number of rotations and allowing the rotatable element to enter a coast down welding stage for a predetermined period of time, after which time the coast down rotation is stopped and a final forge pressure is applied whereby the rotational position of the rotatable element is precisely located relative to the fixed element when weldment is complete.

7 Claims, 10 Drawing Figures

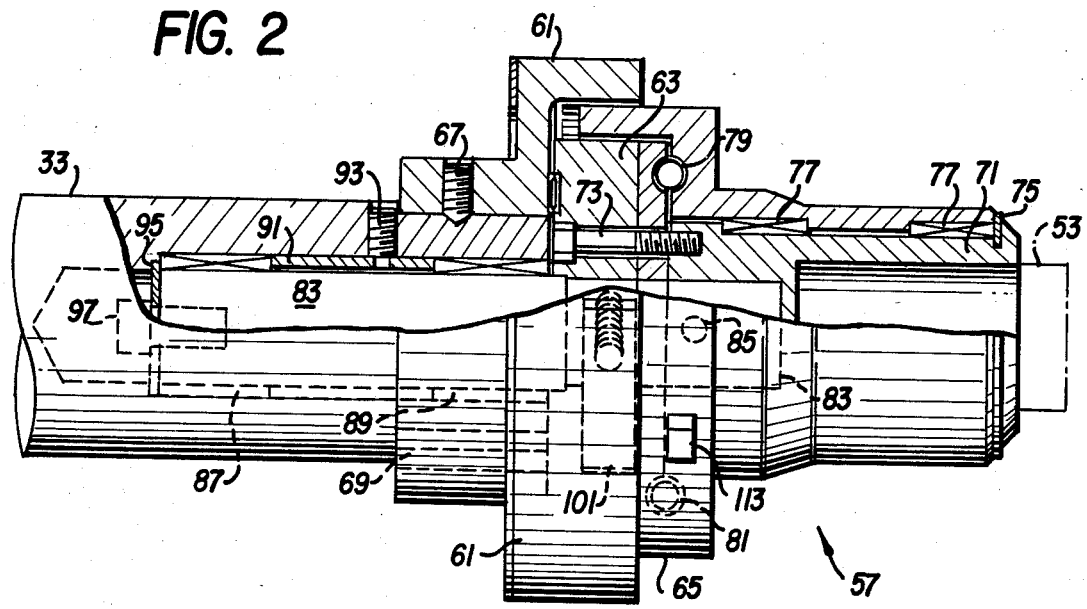

METHOD AND APPARATUS FOR FRICTION WELDING

This application relates generally to friction welding and more specifically to friction welding of a rotatable element to a fixed element with means for precisely orienting the rotatable element in a fixed predetermined rotational position relative to the fixed element.

Friction welding is a long established and well known production practice and many patents have been issued disclosing the initial concepts together with many variations. Basically, a friction weld is obtained through the application of two mechanical components. One of the components develops friction at the interface at the two parts to be joined in order to generate the required temperature for the weld. The other component produces pressure after the required temperature is achieved, completing the weld.

The advantages of friction welding as a production method are many, among which is cost. Welding cycles are measured in seconds. As an example, the cycle for welding a 2.0"×2.0" aluminum rectangular bar to a 1.0" diameter aluminum rod would require from 10 to 15 seconds when accomplished by friction welding. Welding by more conventional methods would require as much as 5 to 7 minutes.

Another advantage of friction welding is uniformity. The welding cycle is closely controlled so as to provide consistently identical welds and actually compensates for minor dimensional irregularities in the interfaces of the parts to be welded.

Yet another advantage of friction welding is that dissimilar metals such as aluminum and copper may be welded.

Two methods of friction welding are in common use today. These two methods are described by the American Welding Society as "inertia" and "continuous drive". Both methods employ high velocity and pressure to develop the friction required to weld a rotatable part to a fixed part. However, their operating characteristics differ.

The "inertia" method uses a fly-wheel driven by a motor to the speed required to store the total energy required for completing the weld. When this speed is reached, the motor is shut off, and the fly-wheel becomes free-wheeling through the remainder of the weld cycle. The rotatable element to be welded is pressed against the fixed element to be welded. The kinetic energy developed is then converted to heat at the parts interface by the rotational effect created by the fly-wheel and the axial pressure being applied. The weld is complete when rotation comes to a halt and forge pressure is completed.

The "continuous drive" method of friction welding provides a motor for driving the system, but also includes a clutch and brake. The rotatable element to be welded is installed in the machine spindle and is brought up to the required revolutions per minute when the clutch is engaged and moderate interface pressure between rotatable and fixed part to be welded is applied. This causes a rapid generation of heat at the interface which is arrested by applying the brake when the forging range of the material being welded is reached. The axial pressure is then increased to forge the parts together.

Friction welding is commonly used to weld round rods and tubes end-to-end and round rods and tubes to a flat plate. As will be obvious from the foregoing discussion of the continuous drive and the inertia welding methods, neither provides a means of orienting the rotatable element in a final specific rotational position relative to the fixed element to be welded. In both methods, the rotatable element is positioned for welding to the fixed part randomly as far as its rotational position is concerned at the time the weld is completed and the system is halted.

Numerous welding applications required that the rotatable part be in a predetermined rotational position relative to the fixed part. Accordingly, available friction welders cannot be used in such applications.

Accordingly, it is an object of the present invention to provide a method and means of producing friction weldments wherein the rotatable part is precisely oriented as to its rotational position relative to the fixed part. The basic friction weldment method applied is that of a continuous drive which is radically modified by the present invention, so as to slow the rotation of the machine at the end of the welding cycle, initiate an escapement mechanism, and, finally, orient the rotational position of the rotatable part relative to the fixed part. When such a position is reached, forging pressure is applied to complete the weldment.

This and other objects of the invention will become obvious from the following description when taken in conjunction with the drawings.

BRIEF DESCRIPTION OF THE DRAWINGS

FIG. 2 is a partial sectional view of the inner spindle, spindle nose and escapement means used for orienting the rotatable element;

FIG. 3 is a partial sectional end view of FIG. 2;

DETAILED DESCRIPTION OF A PREFERRED EMBODIMENT OF THE INVENTION

Figure 1:
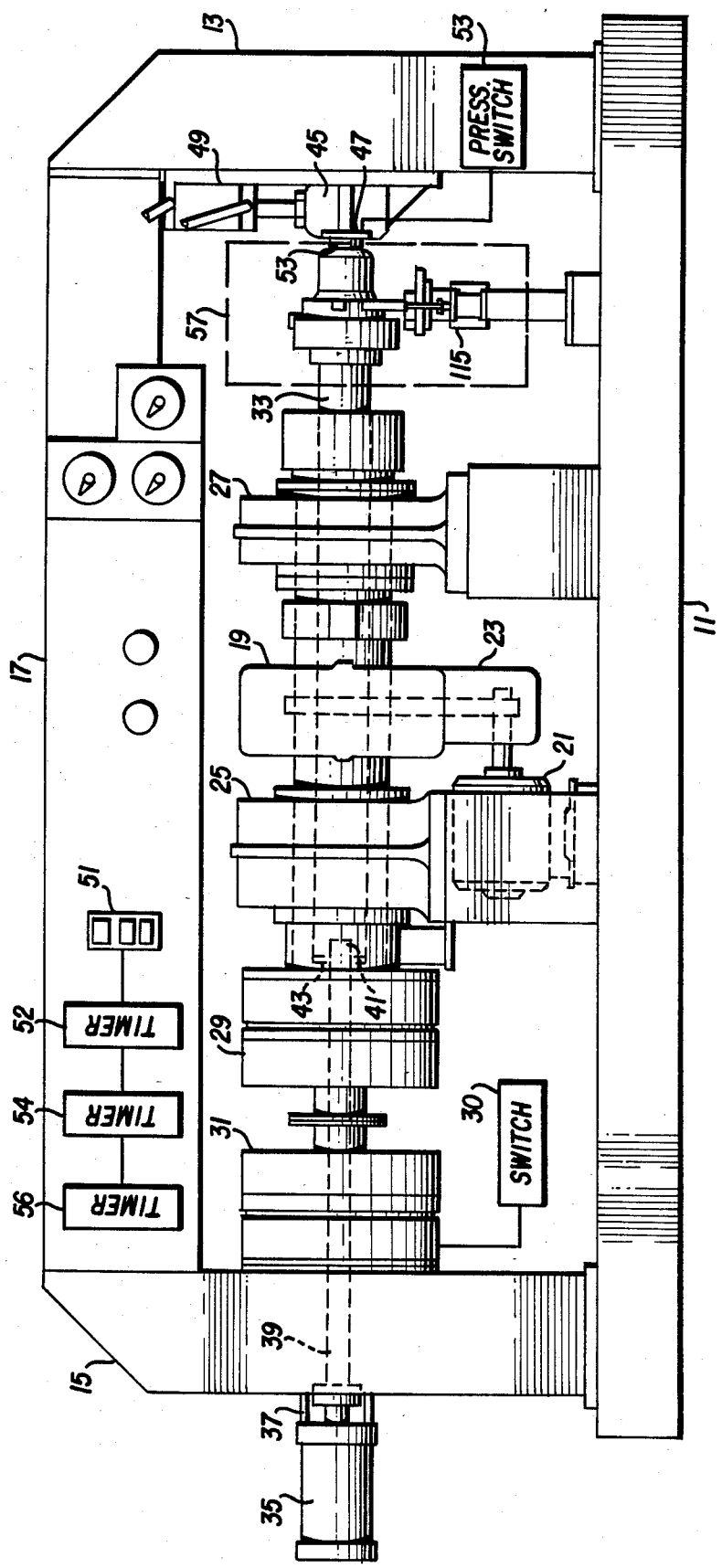
FIG. 1 is a schematic representation and elevation of the friction welding machine without the normal covers, guards and doors.

Turning now to FIG. 1, there is shown base 11 which supports the welding equipment and has extending upwardly therefrom support columns 13 and 15. Beam 17 extends between support columns 13 and 15 to provide mechanical support and a means for mounting the various timers and switches which are used with this type of equipment.

Main drive spindle 19 is driven by motor 21 through a drive system such as chain drive 23. Main drive spindle 19 is supported by means of pillow blocks 25 and 27 which include therein bearing support members. Brake 31 and clutch 29 are provided in the usual fashion for braking and disengaging the system.

The items discussed so far are common components within a well known continuous drive type of friction welding apparatus. The following description includes the modifications and additions which are part of the present invention.

Inner spindle shaft 33 is concentrically mounted within main drive spindle 19. It is advanced during the welding cycle and retracted upon completion of the welding cycle by means of hydraulic ram 35. As shown, hydraulic ram 35 is mounted to support column 15 with thrust bearing 37 being fixed to the hydraulic cylinder of the ram wherein the thrust bearing bears against linear spline shaft 39. Linear spline shaft 39 traverses through brake 31 and clutch 29 and terminates in linear bearing retainer 41 contained in a counter bore in inner spindle shaft 33. Bearing plate 43, screwed to the end of inner spindle shaft 33, contains linear bearing retainer 41.

Vise 45 grips fixed element 47 to be welded by means of pressure delivered by the hydraulic vise ram 49. The function of counter 51 in the welding cycle will be later described in detail.

Figure 7:
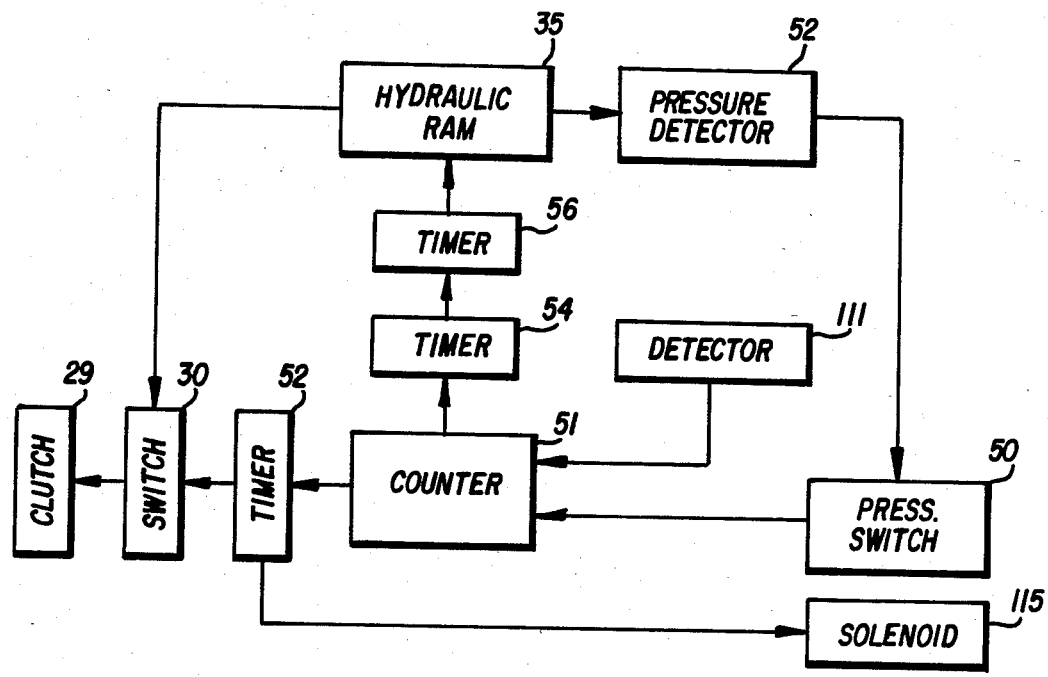
FIG. 7 is a schematic diagram of the various detecting and actuating components.

The sequence of operation of the components described above will now be described with reference to FIG. 1 and the schematic of FIG. 7.

After starting the machine, including motor 21, fixed element 47 to be welded is installed in vise 45. Rotatable part 53 to be welded is installed in spindle nose assembly 57 (FIG. 1).

A transparent guard (not shown) is closed over the welding area for protection of the operator. This activates hydraulic vise ram 49, thus clamping fixed element 47 rigidly. At the start of the weld cycle, hydraulic ram 35 advances forward, pressing thrust bearing 37 against spline shaft 39 which, being connected to inner spindle shaft 33, moves inner spindle shaft 33 to the right as shown in FIG. 1.

The advance of hydraulic ram 35 moves switch 30 to the on position, activating clutch 29 so as to engage main drive spindle 19. When inner spindle shaft 33 is advanced to the point where element 53 contacts element 47, the hydraulic pressure is then monitored by pressure detector 52 and, at a predetermined pressure, activates switch 50 which enables counter 51, thus commencing decrementation.

Turning now to FIGS. 2 through 6, there is illustrated in detail spindle nose assembly 57, shown in dotted lines in FIG. 1, to more particularly describe the operations and the particular components. Again, these Figs. are described in conjunction with the schematic of FIG. 7.

Spindle nose assembly 57 includes three hubs; drive hub 61, driven hub 63 and escapement hub 65. Drive hub 61 is connected to inner spindle shaft 33 by means such as set screw 67 which prevents lateral movement of the hub and key 69 which anchors the hub radially. Driven hub 63 is bolted to spindle nose 71 by means such as bolt 73.

Escapement hub 65 is positioned by locking ring 75 on spindle nose 71 and freely rotates on bearings 77 mounted in escapement hub 65. Escapement hub 65 is also aligned with driven hub 63 by compression springs 79 and 81. Accordingly, escapement hub 65 and driven hub 63 rotate together.

Spindle nose assembly 57 also includes spindle nose shaft 83 which is pinned to spindle nose 71 by pin 85 and is mounted on bearings 87 and 89 in the inner bore of inner spindle shaft 33 and spaced by spacer 91. Spacer 91 is fixed in position by retaining screw 93. Washer 95 bears against bearing 87 under pressure from retainer bolt 97 which is threaded into spindle nose shaft 83.

Links 101 and 103 are assembled in pivotal position in driven hub 63, and are biased outwardly by extension springs 105. Due to the pressure from extension springs 105, links 101 and 103 are engaged in recesses 107 and 109 in drive hub 61 so that hub 61 and 63 rotate together.

Accordingly, entire spindle nose 57 is in rotation at the onset of the welding cycle as discussed relative to the basic system of FIG. 1.

Figure 4:
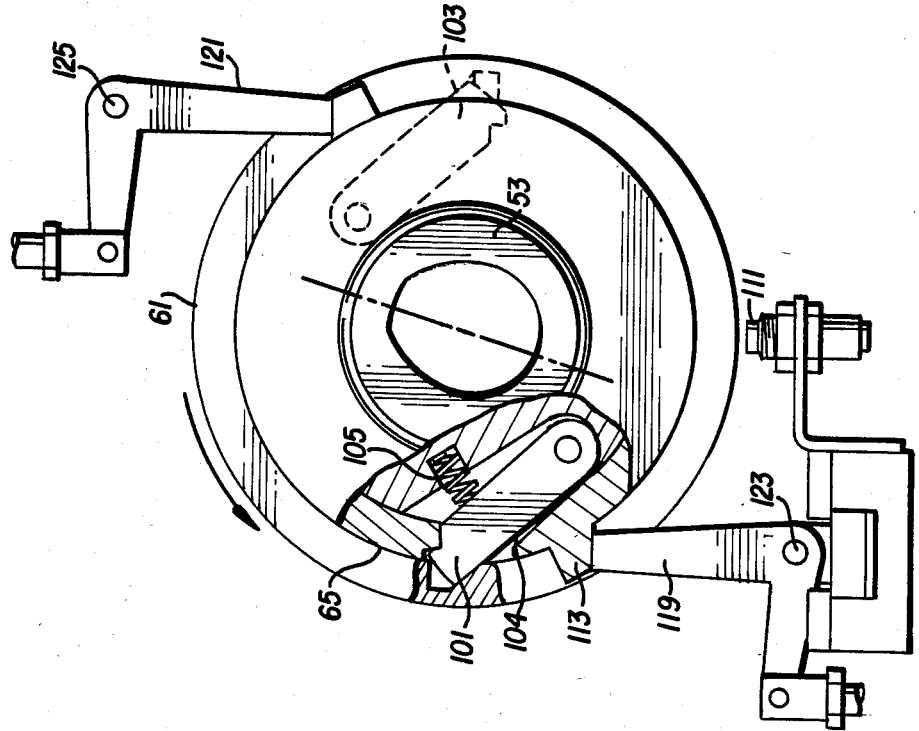

After counter 51 has been enabled by pressure switch 50, detector 111 senses the number of revolutions of driven hub 61 by monitoring each pass of stop 113. This may be detected by photoelectric means, capacitive means or any other well known technique. A predetermined number which has been preset in counter 51 determines the number of revolutions of the rotatable part prior to coast down weldment. This number is decremented by detector 111 each time stop 113 passes thereby. When counter 51 reads zero, having counted down a preset number of spindle revolutions, switch 30 is activated to disengage clutch 29 (FIG. 1) so as to disengage main drive spindle 19 from spline shaft 39. Additionally, when counter 51 reads zero, count down timer 52 is actuated. Timer 52 controls the number of revolutions of rotatable element 53 during coast down. At the end of this time period, solenoid 115 is actuated so as to move lever 119 into the position as shown in FIG. 4 so as to mate with stop 113.

Figure 6:
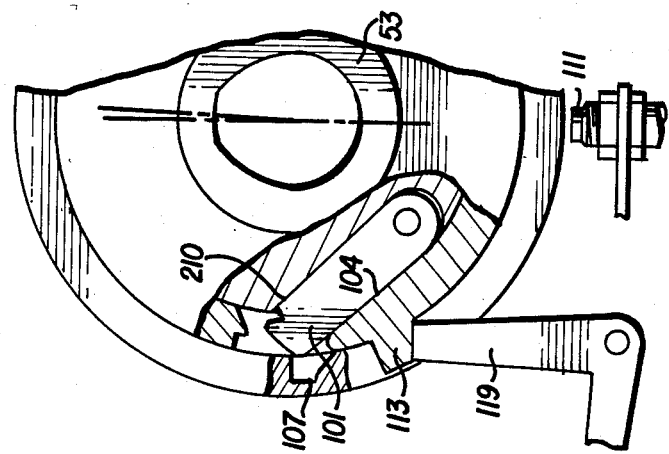
FIGS. 4, 5 and 6 are views similar to FIG. 3 showing the process whereby escapement is provided.
Figure 5:
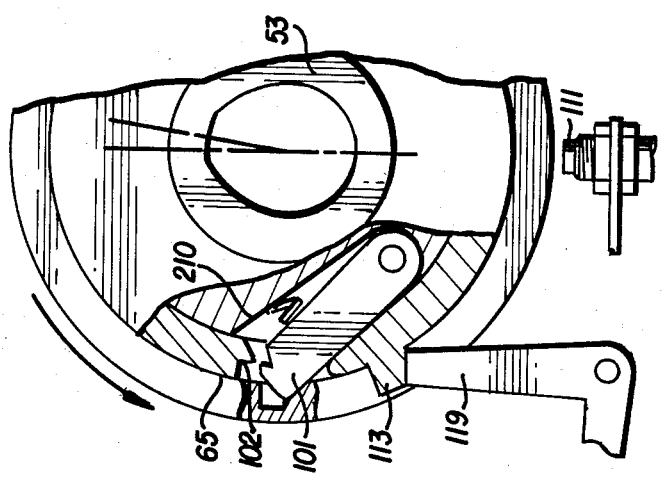

FIG. 3, as discussed above, discloses the position of links 101 and 103 at the start of the cycle whereby all hubs are rotating together. FIGS. 4, 5 and 6 show a sequence of escapement allowing the operation as discussed above to occur.

Solenoids 115 and 117 (FIG. 3) are energized so as to pivot levers 119 and 121 about their pivot points 123 and 125 to a position so as to intercept stops 113 and 114 upon actuation as described above. Since both levers operate in the same manner, the operation of only one will be described. Stop 113 is intercepted by lever 119 and escapement hub 65 ceases to rotate. Since escapement hub 65 and driven hub 63 are aligned by compression springs 79 and 81 (FIG. 3), driven hub 63 also ceases its rotation. When escapement hub 65 ceases to rotate, drive hub 61 moves the end of link 101 away from contact with finger 102 of escapement hub 65 (FIG. 5). As the end of link 101 passes out of recess 107 in drive hub 61, cam surface 104 of escapement hub 65 forces link 101 inwardly against the bias of spring 105 so that hub 63 is no longer driven by drive hub 61 and escapement is complete (FIG. 6).

Compression springs 79 and 81, which align driven hub 63 with escapement hub 65, compress clockwise in countering the stopping action of escapement hub 65 until link 101 is aligned in a wedging action between surface 104 of escapement hub 65 and surface 210 of driven hub 63. Spindle nose 71, which is connected to driven hub 63 by bolt 73, also ceases to rotate. Since the mechanical interface is constant for each operation, the degree of rotation allowed by springs 79 and 81 after escapement, which is normally less than 20°, is known and the rotatable element may be initially secured in the spindle nose in a position such that the desired final rotational alignment results. The position of rotatable element 53 is indicated by the center line therethrough during the escapement cycle of FIGS. 4 through 6.

When the coast down weld cycle is timed and completed, two further timers are energized. Forge delay timer 54 provides the necessary interval for escapement hub 65 to complete its rotation to orientation before the forging operation is initiated. Forge pressure is then applied. Hub 65 has come to a halt and forge duration timer 56 continues for a predetermined time to complete the forging operation.

Figure 8:
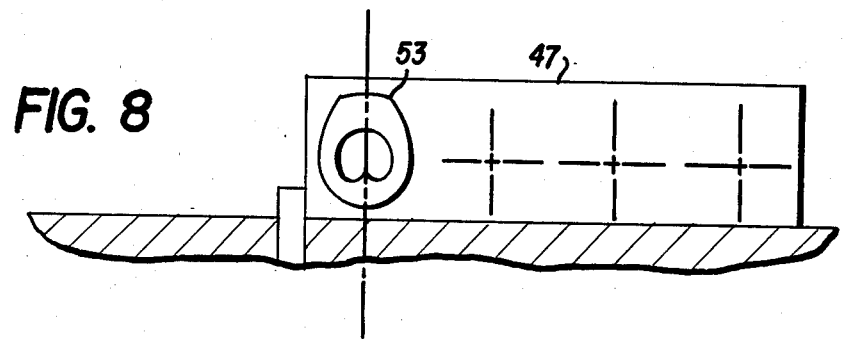
FIG. 8 is a elevational view of a plate with a terminal connected thereto.

One of the uses for this type of friction welding equipment is for the welding of outlets to bus bars. When these terminals have a particular configuration, such as the oblong configuration shown in FIGS. 8, 9 and 10 with internal specific configurations, they must be in proper alignment relative to the bus bar and relative to each other since cable connections require such proper alignment. The configurations shown are particularly designed to accept dual cables within a single terminal and in such cases alignment is critical.

Figure 9:
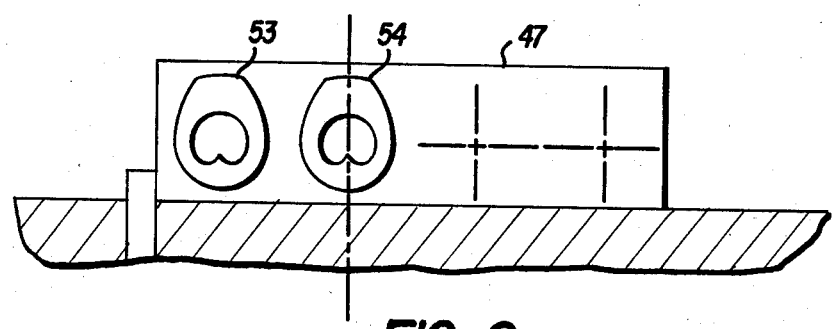
FIG. 9 is a view similar to FIG. 7 with two terminals added.
Figure 10:
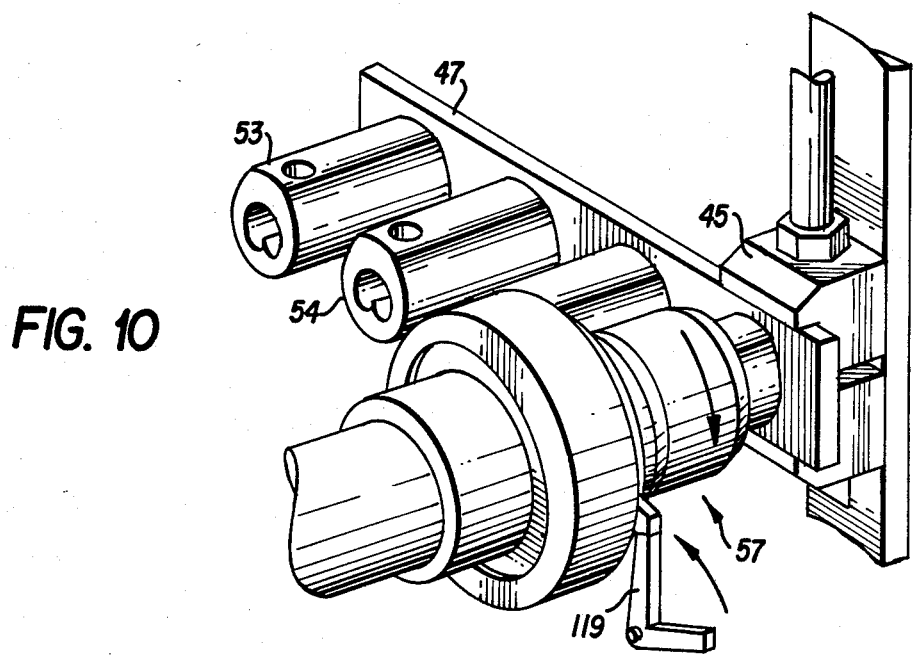
FIG. 10 is a perspective view of the general process showing a plurality of connectors in place and a connector being welded to the bus bar.

As can be seen from FIGS. 9 and 10, a number of connectors may be welded to a single bus bar simply by releasing the pressure on the vise and moving the bus bar so as to accept the next weldment. It is quite obvious that many other welding processes will benefit from the present invention.

The above description and drawings are illustrative only since the various components could be modified without departing from the scope of the invention which is to be limited only by the following claims.

What is claimed is:

1. A continuous drive friction welder including apparatus for orienting a rotatable element relative to a fixed element during the welding process comprising
   mounting means for supporting said fixed element;
   support means for holding said rotatable element; said support means comprising;
      a drive hub;
      a driven hub coaxial with and driven by said drive hub;
      an escapement hub coaxial with and extending between said driven hub and said drive hub;
      a linkage between said driven hub and said drive hub so as to drive said driven hub; and
      a cam on said escapement hub for forcing said linkage into said escapement hub whereby said drive wheel ceases to impart motion to said driven wheel;
   means for rotating said support means;
   means for axially advancing said support means so that said rotatable element contacts said fixed element under a predetermined pressure;
   means for disengaging said rotatable element support means from said rotating means after a predetermined number of rotations so that said rotatable element and associated support means continue to rotate into a coast down welding stage;
   means for stopping said rotatable element after a predetermined period of time subsequent to said predetermined number of rotations; and
   means for actuating said axial advancing means at the end of said predetermined period of time so as to apply a final forge pressure for completing the welding process whereby the rotational position of said rotatable element is oriented relative to said fixed element when weldment is completed.

2. The apparatus of claim 1 further comprising means for timing said forge pressure period.

3. The apparatus of claim 1 wherein said means for stopping said rotatable element comprises
   a lever mounted adjacent said support means;
   a stop mounted on said support means; and
   a timer for causing said lever to engage said stop after said predetermined time.

4. A continuous drive friction welder including apparatus for orienting a rotatable element relative to a fixed element comprising
   means for supporting said fixed element;
   a main drive spindle;
   an inner spindle shaft mounted concentrically within and extending outwardly from said main drive spindle and rotatable therewith;
   means for axially advancing said inner spindle shaft relative to said fixed element so that said elements are placed in contact under a predetermined pressure;
   a spindle nose at the terminal end of said inner spindle shaft for gripping said rotatable part; said spindle nose comprising;
      a drive hub;
      a driven hub coaxial with and driven by said drive hub;
      an escapement hub coaxial with and extending between said driven hub and said drive hub;
      a linkage between said driven hub and said drive hub so as to drive said driven hub;
      a stop on said driven hub;
      a cam on said escapement hub for forcing said linkage into said escapement hub when said driven hub is restrained through said stop whereby said drive hub ceases to drive said driven hub;
   motor means for driving said main drive spindle, said inner spindle shaft and said spindle nose a predetermined number of rotations after said rotatable part and said fixed part are in contact;
   means for disconnecting said motor means and said main drive spindle from said inner spindle shaft after said predetermined number of rotations whereby said spindle nose and said rotatable element continue to rotate into a coast down welding stage;
   means for stopping the rotation of said rotatable part after a predetermined period of time subsequent to said disconnection of said motor means; and
   means for applying forge pressure through said axial advancing means at the end of said predetermined period of time whereby the rotational position of said rotatable element is oriented relative to said fixed element when weldment is completed.

5. The apparatus of claim 4 further comprising
   a lever means movable into and out of contact with said stop; and
   timing means for moving said lever into contact with said stop a predetermined time after disconnection of said motor means.

6. The apparatus of claim 4 further comprising
   means for delaying application of said forge pressure until said rotatable element has stopped.

7. The apparatus of claim 4 further comprising means for timing said forge pressure.

* * * * *